Oct. 3, 1939.    W. HEINRICH    2,175,165
REMOTE CONTROL DEVICE
Filed May 12, 1938    3 Sheets-Sheet 1
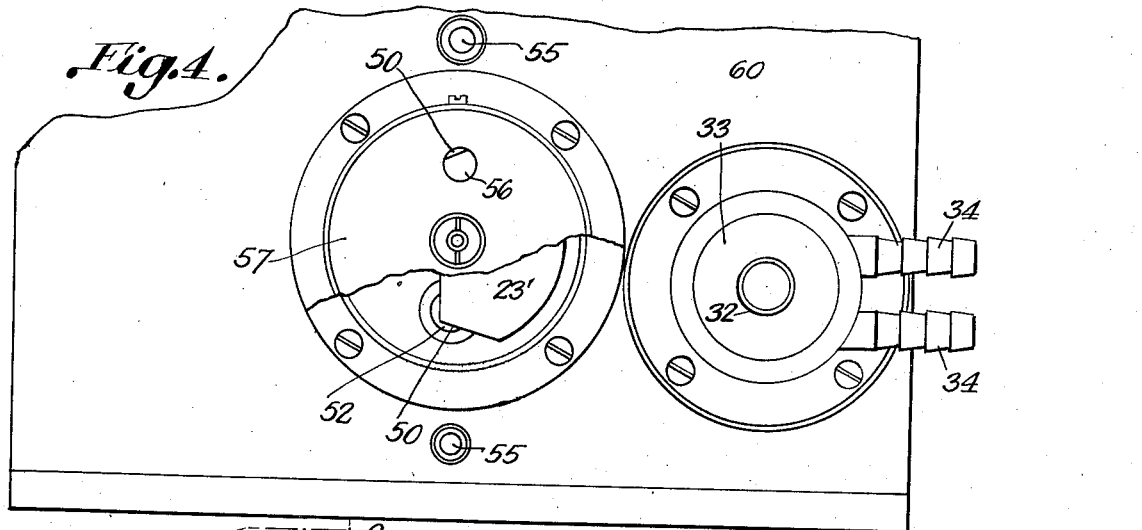
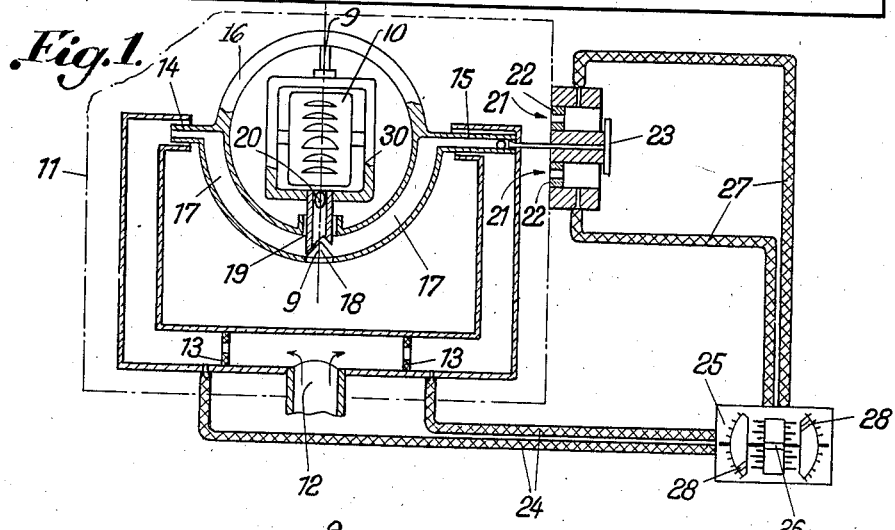
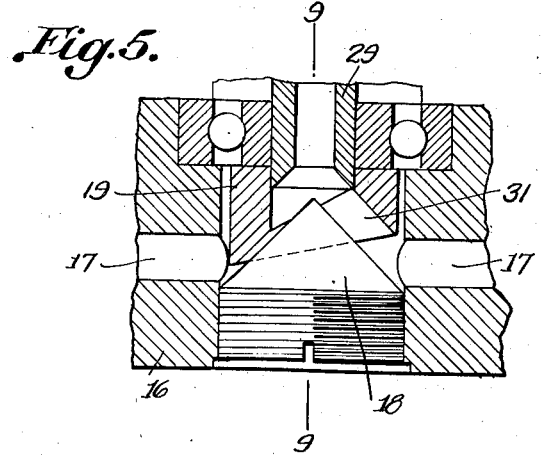
Inventor:
Walter Heinrich

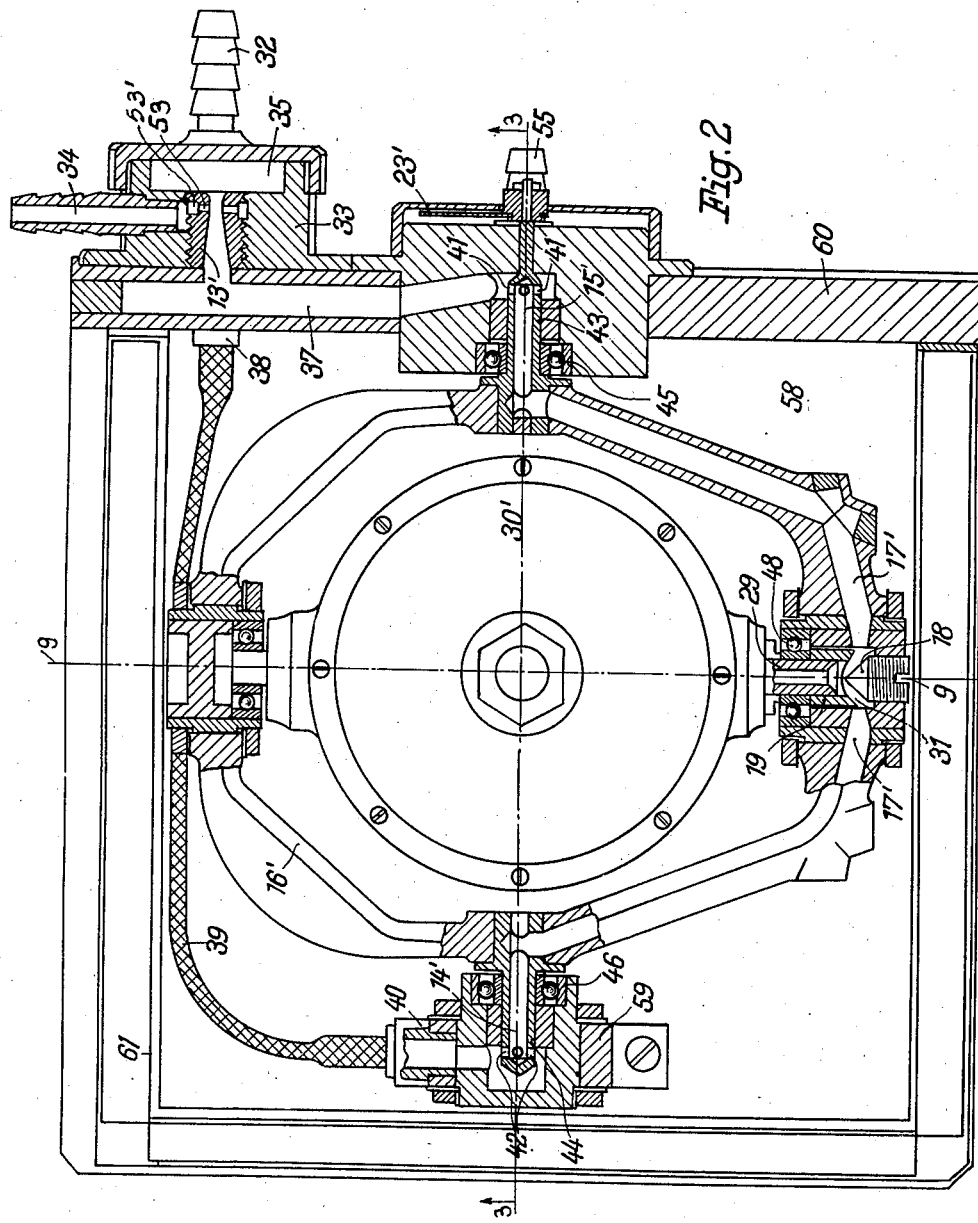

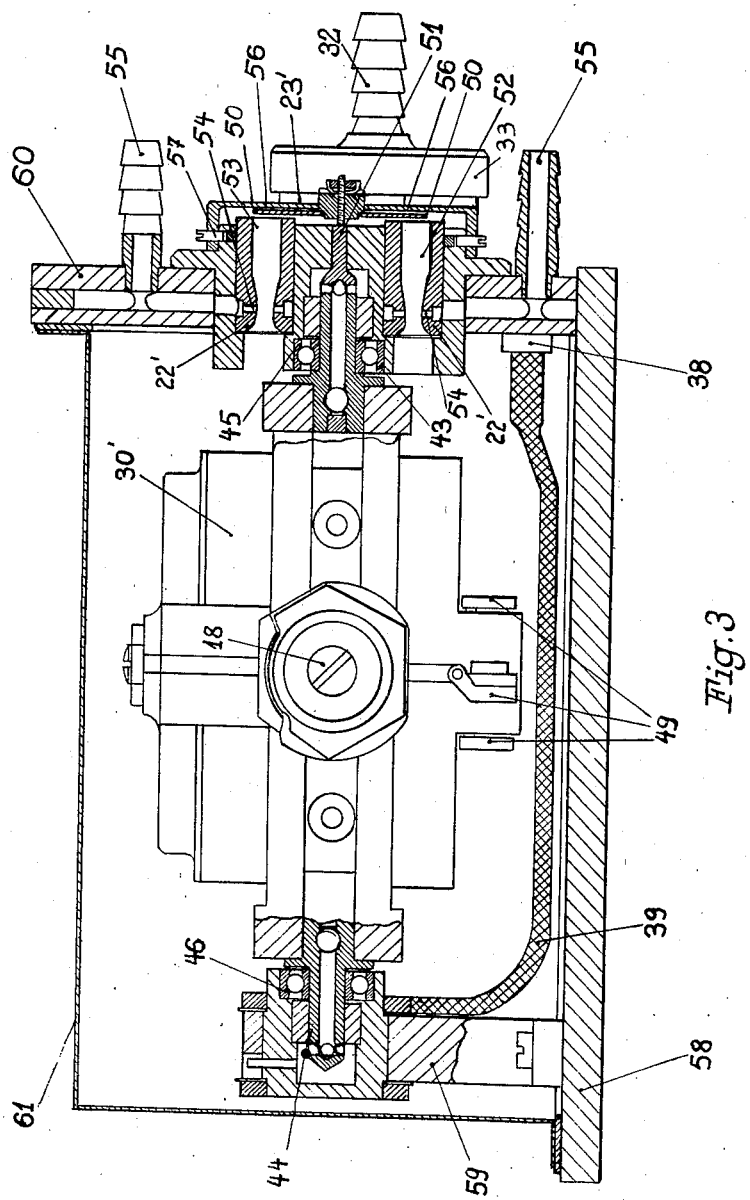

Patented Oct. 3, 1939

2,175,165

UNITED STATES PATENT OFFICE 2,175,165

REMOTE CONTROL DEVICE

Walter Heinrich, Berlin-Steglitz, Germany, assignor to Askania-Werke A. G. vormals Centralwerkstatt-Dessau und Carl Bamberg-Friedenau, a corporation of Germany Application May 12, 1938, Serial No. 207,628
In Germany May 10, 1937

9 Claims. (Cl. 33—204)

The invention relates to fluid operated remote control devices, in which a difference in pressure is created within a pressure line between two constrictions by varying the ratio of the resistances offered to the fluid passing through said line, and more particularly to control systems operated in dependence on the movements of a gyro rotor suspended on gimbals.

According to former suggestions for transmitting the rotating movements of a member, suspended on gimbals, around the inner gimbal axis, a mechanical transmission is necessary between said member and the support of the gimbal system.

The main purpose of the invention is to dispense with such mechanical transmissions, in that one part of a variable constriction is directly connected to the inner axis gimbal and the other to the gimbal ring. This variable constriction operates together with further constrictions with constant outlet cross-sections, which are suitably provided within channels at the instrument housing, wherefrom the control lines may be branched off.

In the preferred form of my invention the variable constriction consists of a convex and a concave part, the former extending eccentrically into the latter, whereby on relative rotational movement of the two parts the axial cross-section is changed and the flow of a pressure means fed sidewardly between the two parts is alternatively restrained.

A further object of my invention is to use the same air for also transmitting the movements of the body in gimbal suspension about the outer gimbal axis.

Still further objects and advantages will be clear from the specific form illustrated in the accompanying drawings, in which Fig. 1 is a schematic drawing to illustrate the air conduit.

Fig. 2 is a plan view of a gyro vertical according to the invention.

Fig. 3 is a vertical section along the line 3—3 in Fig. 2.

Fig 4 is a view upon the right side of the casing.

Fig. 5 is a practical construction of the variable constriction on an enlarged scale.

In Fig. 1, to which reference is made to explain the manner of operation, the gyro system is viewed from above in connection with a pneumatically operated indicating device, as described in an earlier application of H. Schuchardt, Ser. No. 193,594, filed March 2, 1938. The gyro rotor 10 is drawn tilted by 90° with respect to its normal position, in which it is held in a well-known manner by a pendulum-controlling device, for the purpose of better illustrating.

Compressed air enters the instrument casing 11 in direction of the arrows 12. The air current passes through two constrictions 13 and is conducted to the two outer gimbal bearings 14, 15 of the gimbal ring 16, whose lower part is constructed hollow. After passing through the conduits 17, the air passes through the variable constriction 18, 19 to the gyro driving nozzle 20, from where the air enters the casing after impinging on the gyro rotor 10.

The air passes out of the casing in direction of the arrows 21, thereby first passing through two parallel constrictions 22 and its flow being influenced on entering into the open by an eccentric controlling disc 23 corresponding to the position of the gimbal ring 16.

Between the fixed constrictions 13 and the variable constriction 18, 19 two conduits 24 are branched off in which a differential pressure arises as soon as the gyroscope is inclined towards the casing 11. This differential pressure can be used in a well known manner to control an automatic stabilising device, such as an automatic pilot for aircraft. In Fig. 1 the pressure lines 24 are connected to a bank indication 28 of a blind flying instrument 25 of the repeater type, as described in the said earlier specification Ser. No. 193,594.

Two pressure lines 27 are branched off in a similar manner between the constrictions 22 and the controlling disc 23, said lines are for the pitch indication 26 of the instrument 25.

The diagram illustrating the air conduit may be compared with a Wheatstone bridge. 13 are two fixed resistances inserted in the circuit, whilst the resistances, which the partial flows meet at the throttle 18, 19, are only equal in the neutral position of same. In the position according to Fig. 1 the resistance for the left part of the flow is essentially higher so that in the lower pressure line 24 a surplus pressure exists in comparison to the upper.

Details of the throttle valves 18, 19 may be gathered from Fig. 5, in which the valve takes up a position turned by 90° from its normal position, as in Fig. 1. In the gimbal ring 16 is a cone 18 having a fine screw thread so that the distance between 18 and 19 may be adjusted very exactly. The sleeve 19, cut off obliquely, on the hollow gimbal axis 29 has a boring eccentric to the pivot axis 9 . . . 9 of the rotor bearing support 30, into which the cone 18 projects with its axis of symmetry in direction of the inner gimbal axis 19. The feeding of the pressure medium is effected sidewardly through the two channels 17.

In the position illustrated in Figs. 1 and 5 the air flowing through the left channel 17 has its greatest resistance, whilst the cross-section for the air coming from the right through the other channel 17 is unrestricted. In the normal position, as in Fig. 2, the resistance of the flow is equal on both sides and, as is practical, about as large as that of the fixed constrictions 13.

The co-operation of the throttles 22 with the outlet cross-sections, variable by means of the controlling disc, is effected in a similar way. The controlling could be effected here in the same manner as by the throttle 18, 19.

In the horizon gyroscope illustrated in Figures 2 to 4, the fixed constrictions are constructed as Venturi nozzles in order to increase the differential pressure, and the differential pressure is measured at the point of the smallest cross-section, where due to the increased velocity of flow there exists an increased suction. In this manner a greatly increased sensitiveness is achieved, whose magnitude depends on the coefficient of the nozzles. A similar effect may be achieved by using pressure plates in place of the Venturi nozzles through branching off the impulse conduits within the suction range of the constrictions.

The supply of the compressed air is effected through the casing-pipe 32, being at the projection 33 of the instrument, said projection carrying also the two connections 34 for the impulse or pressure lines 24 (Fig. 1). The air first passes through the pipe 32 into a chamber 35, where it is divided between the nozzles 13'. Of the two nozzles only the upper one is to be seen, through which compressed air passes through a channel 37 into the right gimbal ring bearing 15'. The lower nozzle is connected to a hose connection 38, from which a hose 39 passes to a tube 40 at the other gimbal ring bearing. At the maximum constriction of the nozzles 13' is provided a boring 53 and a ring channel 53' for transmitting the suction created in the nozzles to the connections 34 for the differential pressure lines.

The air flows through the borings 41, 42, respectively, in the hollow shafts 43, 44 of the gimbal ring 16' into its lower part 17', which is constructed hollow, and from both sides to the constriction 18, 19, which in the normal position of the gyro casing 30', illustrated in Fig. 2, offer equal resistance to the air on each side. After passing through the hollow shaft 29, which is like the outer gimbal shafts 43, 44 (at 45, 46) mounted on ball bearings (at 48), the air reaches the driving nozzle for the rotor, said nozzle being arranged in a well known manner in the gyro casing 30'.

Thus after the air has been used for driving the gyro rotor, it passes out of the gyro casing 30' through four apertures, which are at the lower side of the casing and displaced by 90° in opposition to each other. In front of these apertures pendulum shutters 49 are pivoted in a well known manner, of which in Fig. 3 one is visible from the front and two from the side. The force of the air jets coming out of the four apertures varies in accordance with inclinations of the gyro rotor axis against the vertical, whereby torques are caused which return by precession the gyroscope to its original position.

Hereafter the air passes from the inside of the instrument into the open air through the nozzles 22', the distribution of the air between the two nozzles depending on the position of the controlling disc 23'. The controlling disc 23' possesses two knife edges 50 (compare Fig. 4) which cover the greater part of the outlet apertures 52 in the neutral position. Upon movements of the gyroscope around the outer gimbal axis 43, 44, the controlling disc 23, fastened to a projection 51 of the gimbal shaft, covers one of the outlets of the conduits 52 more than the other, thus permitting the passage of the main part of the air through the other aperture.

The impulse conduits are branched off from the nozzles 13', 22' at 53, 54, respectively, i. e., at the point of the highest velocity of flow and, therefore, of the maximum constriction, so that the differential pressure in the impulse conduits is multiplied in the already mentioned manner.

For connecting the impulse conduits to the nozzles 22' the hose tubes 55 are provided. Two holes 56 are provided in the cap 57 covering the controlling device 22', 23' for the exit of the used air.

The entire gyroscope arrangement is mounted on a base plate 58, carrying the bearing support 59 and the side wall 60. For facilitating adjustment of the instrument a removable box 61 is provided, all the parts of the instrument being readily accessible after removal of the same.

In place of the indicating instrument shown in Fig. 1, the impulse conduits 24, 27 may be connected to an automatic controlling device, in which case the variable constrictions 18, 19 and 22, 23 can be constructed (if desired) in such manner that the maximum pressure is already reached after changes of inclination by few degrees.

In case of an electrically driven gyroscope the air will only be used for the purpose of remote control and if wanted for adjusting the gyro-system into the desired direction. The invention may also be used for the remote transmission of the position of any Cardanically suspended body.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

What is claimed is:

1. In a fluid operated relay system for transmitting the position of a body supported on gimbals for movement about major and minor axes, a gimbal ring, a support for said ring, means forming a pair of ducts leading from said support to one minor axis gimbal, means for supplying air under pressure to said ducts, a constriction within each of said ducts at said support, throttle means comprising two portions turnable one relative to the other and fed by said ducts, the one portion of said throttle means being fixed to the gimbal ring, the other portion being fixed to said body, said portions co-operating to differentially open and close said ducts when the gimbal ring moves angularly relative to the body, and two pressure lines each connected to a respective duct.

2. In a fluid operated relay system, a throttle valve consisting of a convex and a concave conical portion extending into one another with their axes of symmetry in parallelism, the one of said portions being turnable about the axis of symmetry of the other portion, two opposite ducts connected to lead pressure fluid sideways between the two portions of said valve, a common conduit along the axis of said turnable portion, a constriction within each of said ducts, and two pressure lines each connected to a respective duct between said constriction and said valve for transmitting the differential pressure created by turning of the valve.

3. A fluid operated relay system according to claim 1, in which each pressure line is connected to the respective duct adjacent the respective constriction within the suction range of the same.

4. In a gyroscopic control apparatus, the combination with a rotor and rotor-bearing frame, a gimbal ring pivotally supporting the frame, outer gimbal bearings supporting said ring, there being a pair of channels in the ring, there being two conduits each communicating with a respective one of said channels for supplying air thereto through the outer gimbal bearings, a throttle valve comprising two portions turnable one relative to the other, one portion being fixed to the gimbal ring, the other portion being fixed to said frame, said portions co-operating to differentially restrain the air flow through the respective channel when the gimbal ring angularly moves relative to the gyroscope, a constriction within each of said conduits, and two pressure lines each connected to the respective conduit between said constriction and said throttle valve.

5. In a gyroscopic control apparatus enclosed within a housing, a gimbal ring mounted within the housing on outer pivots for movement about a first axis, a rotor and rotor-bearing casing mounted in said ring for movement about a second axis normal to said first axis, there being a pair of channels in the gimbal ring, two conduits each communicating with the respective channel for conveying air thereto through the outer gimbal pivots, a constriction within each of said conduits, first throttle means operated by the rotor casing and gimbal ring and acting to differentially restrain the air-flow through the respective channel when the gimbal ring moves relative to the casing, a first pair of differential pressure lines fixed to said housing each connected to a respective conduit between said constriction and said throttle means, two ducts connecting the interior of the housing with the atmosphere, a constriction within each of said ducts, second throttle means operated by the gimbal ring and said housing and acting to differentially restrain the air-flow through said ducts when the housing moves angularly relative to the gimbal ring, and a second pair of differential pressure lines each connected to a respective duct between said second named restriction and throttle means.

6. In a gyroscopic control apparatus, the combination with an air-driven rotor and a rotor-bearing frame, a gimbal ring pivotally supporting the frame, a support pivotally mounting said ring, there being a pair of channels in said ring, a driving nozzle for the gyro rotor supplied by each of said channels, two ducts each connected to supply air to a respective channel, two constrictions one in each of said ducts, throttle means operated by said frame and gimbal ring and acting to differentially vary the air flow through the respective channel when the frame moves angularly relative to the ring, and two pressure lines each connected to a respective duct between the constriction and said throttle means for transmitting the differential pressure thus created.

7. In a control apparatus of the gyro vertical type, a gyro casing, a rotor in said casing having a normally vertical spin axis, a gimbal ring with horizontal axes for supporting said casing in substantially neutral equilibrium, a pair of channels in said ring for supplying air therethrough to the gyro casing, a constriction in each of said channels, throttle means operated by said casing and gimbal ring and acting to differentially vary the air-flow through the respective channel when the gyroscope moves relative to the gimbal ring, two pressure lines connected to a respective channel between the constriction and said throttle means, and pneumatic means for maintaining the rotor spin axis erect, including a plurality of opposed air jets issuing from said casing and gravitationally controlled to exert erecting torques on said casing.

8. In a gyroscopic control apparatus, the combination with a gyroscopic in gimbal suspension for movement about major and minor axes, a gimbal ring, outer gimbal bearings supporting said ring, there being a pair of channels in the ring, there being two conduits communicating with said channels for supplying air thereto through the outer gimbal bearings, a constriction within each of said conduits, a double acting throttle valve operated by the gimbal ring and the gyroscope and acting to differentially open and close the channels when the gimbal ring moves angularly relative to the gyroscope, said valve including an obliquely cut-off sleeve on the minor axis gimbal having a conical bore eccentric to the minor gimbal axis, and a convex cone fixed to the gimbal ring extending into said sleeve symmetrically with respect to the minor gimbal axis, and two pressure lines each connected to a respective conduit between the constriction and said valve.

9. A gyroscopic control apparatus as claimed in claim 8, in which the said cone is screw-threaded and adjustably extends into the said sleeve.

WALTER HEINRICH.